Figure 1:
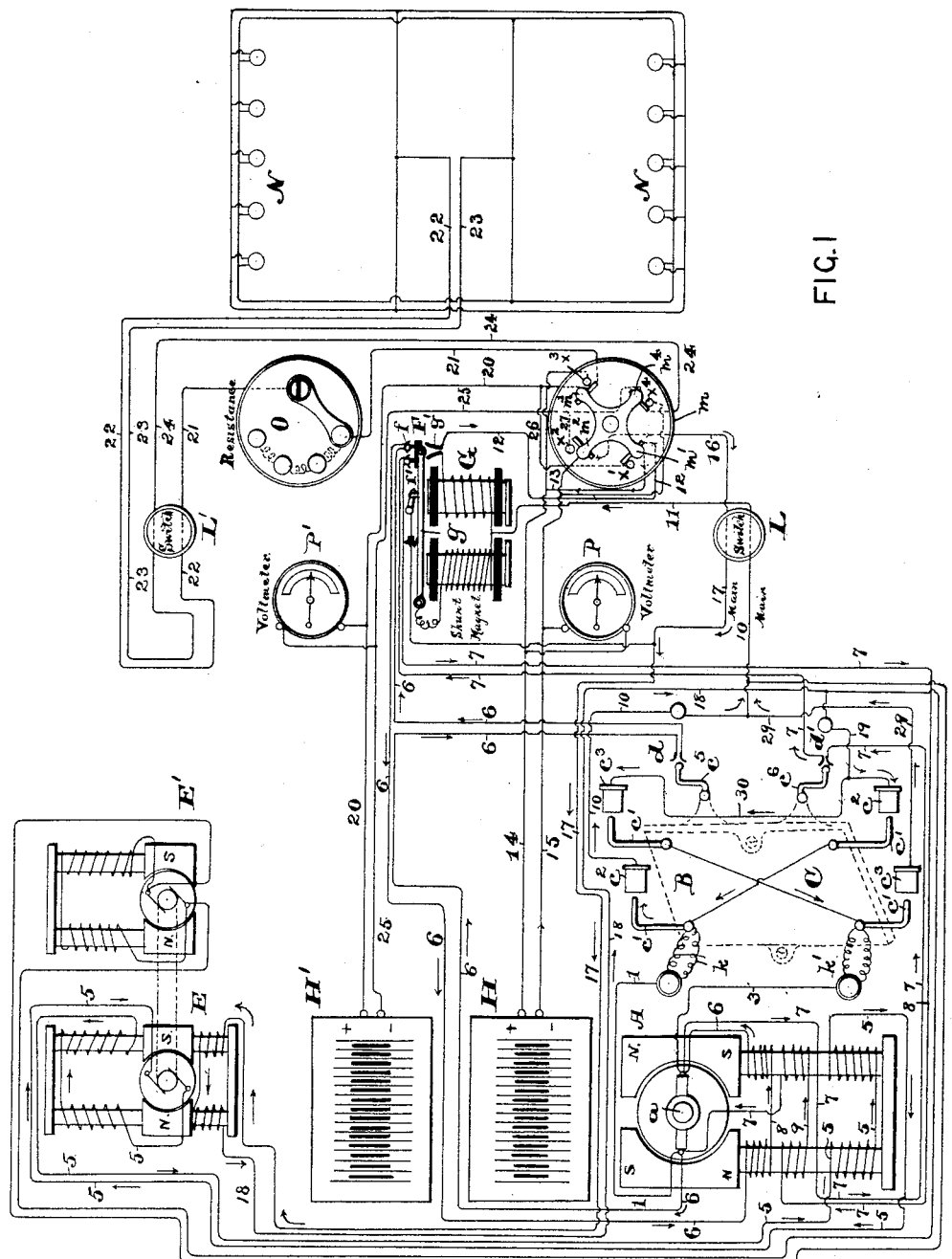

(No Model.) 2 Sheets—Sheet 1.

M. MOSKOWITZ.
MEANS FOR GENERATING ELECTRICITY FROM CAR WHEEL AXLES.

No. 542,771. Patented July 16, 1895.

WITNESSES:
Wm. H. Canfield, Jr.
Philip Henry Ward.

INVENTOR:
MORRIS MOSKOWITZ.
BY
Fred C. Fraentzel,
ATTORNEY

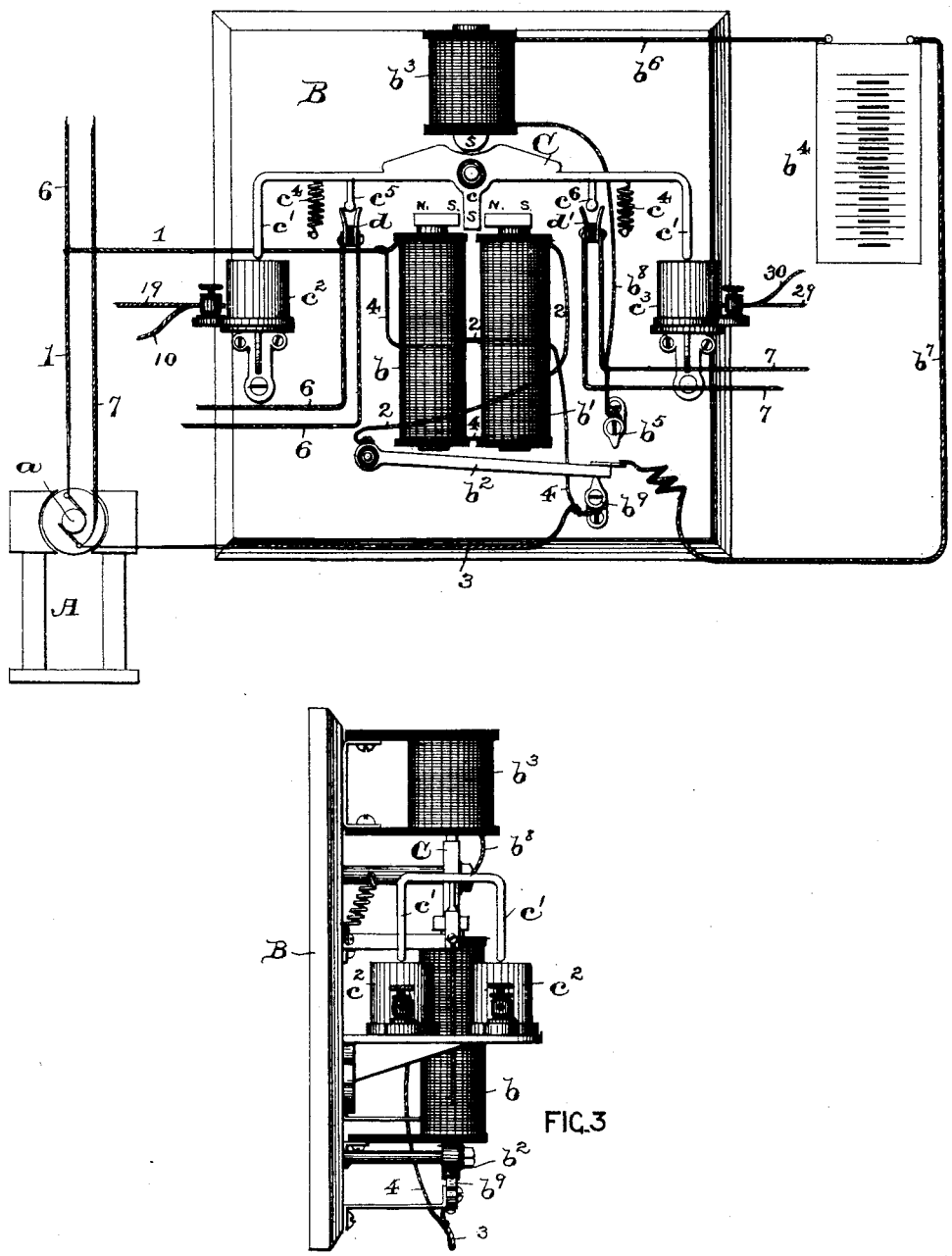

UNITED STATES PATENT OFFICE.

MORRIS MOSKOWITZ, OF NEWARK, NEW JERSEY, ASSIGNOR TO THE NATIONAL ELECTRIC CAR LIGHTING COMPANY, OF WEST VIRGINIA.

MEANS FOR GENERATING ELECTRICITY FROM CAR-WHEEL AXLES.

SPECIFICATION forming part of Letters Patent No. 542,771, dated July 16, 1895.

Application filed February 27, 1895. Serial No. 539,865. (No model.)

*To all whom it may concern:*

Be it known that I, MORRIS MOSKOWITZ, a citizen of the United States, residing at Newark, in the county of Essex and State of New Jersey, have invented certain new and useful Improvements in Means for Generating Electricity from Car-Wheel Axles; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

My present invention relates to a novel system of car lighting, heating, &c., where electricity is employed as the lighting or heating agent, and is designed for use with a dynamo or dynamos placed on the truck carrying the car, the car-wheel axle usually forming the armature-shaft to produce the driving-power.

The invention is designed to provide a simple but complete and effectively-operating system, having a dynamo in said system from which a constant voltage or output is derived irrespective of the axle speed; in which system the dynamo is, furthermore, made self-exciting up to a certain speed and delivers of its own accord a minimum quantity of current, about one-third the voltage of the dynamo, to a machine in said system which I term a "dynamotor," the construction and operation of which is fully described in a previous patent, No. 525,993, granted to me September 11, 1894, and thereby starts the said dynamotor, which will then in turn energize the fields of the main dynamo on the car-wheel axle through an independent circuit connected with said dynamotor as an independently-excited machine.

The invention therefore consists in the arrangement of the main dynamo and the dynamotor with the circuit connecting the same, in combination with the main or working circuit containing the lamps or other translating devices, a pair of storage-batteries in said main circuit connected with a switch, whereby one battery is directly connected in circuit with the main dynamo and is being charged thereby, while the other battery is disconnected with the dynamo and is directly in the lamp-circuit, and an automatic pole-changer in said main circuit, whereby provision is made for the reversal of rotation of the armature in the main dynamo when the car reverses its direction of travel.

The invention therefore consists, generally, in the organization of the complete electrical systems of apparatus and circuits, to be hereinafter more fully described, and finally embodied in the clauses of the claim.

The invention is illustrated in the accompanying sheets of drawings, in which—

Figure 1 is a diagrammatic view, clearly illustrating the arrangement of all the electrical circuits and apparatus therein. Fig. 2 is a detail view of the novel form of pole-changer employed in the present system, and Fig. 3 is a side view of the same.

In said drawings, A indicates the main dynamo, and $a$ the car-wheel axle on which the dynamo is arranged in any suitable manner to adapt it to the purposes for which it is intended. As will be seen from said Fig. 1, said main dynamo is wound in three different ways, the purpose of which is to be fully described hereinafter.

In Fig. 2 I have more clearly illustrated the arrangement of my novel form of pole-changer and its electrical circuits for connecting the same with the main dynamo. I will first describe the operation of the same in connection with the main dynamo A. Said main dynamo is wound in such a manner that its fields are completely dead, with the exception of a feeble current induced in the armature from the residual magnetism in said dead fields, which is allowed to pass to the pole-changer B, flowing through the proper circuits and through the magnets $b$ and $b'$, completing the circuit through a bar-armature $b^2$ and then back to the dynamo, thus energizing said magnets with opposite polarity. The circuit connecting the dynamo A with said magnets $b$ and $b'$ is designated by the numerals 1 2 3. (See more particularly Fig. 2.) Said device B is provided with an upper magnet $b^3$, which is fed from a storage or other battery $b^4$, and has its circuit completed through said magnet $b^3$ and a small contact $b^5$ and the circuit-wires $b^6$ $b^7$ $b^8$.

As has been stated, the residual magnetism from the dead fields of the main dynamo produces a feeble current to sufficiently energize the magnets $b$ and $b'$ to attract the bar-armature $b^2$ and make contact at $b^5$, thereby bringing the magnet $b^3$ in circuit. This magnet, as will be evident, will always be polarized in one direction, causing the lower end of the iron portion of the magnet always to be a negative or south pole.

The two lower magnets $b$ and $b'$ are subject to reversal of polarity according to the direction of rotation of the main dynamo-armature. The result thus brought about will be that the unlike poles will attract and the like poles repel each other. Pivotally arranged above the said magnets $b$ and $b'$ is a bar C, provided at its ends with contact-fingers $c'$, adapted to make contact with certain mercury cups or boxes $c^2$ and $c^3$ or other like contact-making devices, connected up in the main circuit in the manner as will be hereinafter more fully set forth. Said bar C is provided with a finger $c$, which is arranged to extend down between the upper ends of the soft-iron portions of the magnets $b$ and $b'$, as shown, and which becomes magnetized by induction from the magnet $b^3$, and consequently is of a negative polarity at its extreme lower end. Now, when the current from the main dynamo flows in one direction then said iron finger $c$ will be repelled by one of the lower magnets and attracted by the other, and the result is that there will be a movement in either direction, according to the rotation of the dynamo armature and the change of polarity of the said magnets $b$ and $b'$, which produces a movement of the bar C on its pivotal support and thereby causes either of the fingers $c'$ to make contact with either one of the mercury-cups $c^2$ or $c^3$, or other suitable contacts to reverse the current in the main circuit for charging the batteries always in one and the same direction, whether the car is going forward or backward. The circuit 1 2 3 has a path of very low resistance in order that the weak current from the residual magnetism in the fields of the main dynamo will have sufficient strength to energize the magnets $b$ and $b'$, but as soon as the main dynamo delivers its full output said circuit 1 2 3 is broken by the attraction of the bar-armature $b^2$, by breaking contact at $b^9$, and the current passes through a high-resistance circuit 1 4 3, which is then capable of energizing the magnets $b$ and $b'$ sufficiently to maintain the contact of the armature-bar $b^2$. It will thus be seen that the circuit 1 4 3 is a common one, simply starting from the dynamo to the magnets and completing the same in the ordinary manner, while the low-resistance circuit 1 2 3 is subject to make and breaks and completes its circuit through the battery $b^4$ and the magnet $b^3$, in the manner as has been described. The small springs $c^4$ connected with the arm C are for the purpose of maintaining said arm in its neutral position, except when operated upon by the action of the currents, as will be evident. Said arm C is also provided with the contacts $c^5$ and $c^6$ adapted to make contact with certain spring-contacts $d$ and $d'$, respectively, connected up in circuit with the main dynamo to complete the dynamo-circuit in the manner to be hereinafter fully described.

The main dynamo A, as has been stated, is made self-exciting up to a certain point—that is, enough so as to start the said magnets $b$ and $b'$, and also to deliver a small amount of current (about one-third its voltage) through the circuit 5 5 to the dynamotor E E', which is of the construction described in my previous patent, No. 525,993, granted September 11, 1894, thereby starting said dynamotor, which will in turn energize the fields of the main dynamo, as an independently-excited machine. The current passes through the circuit 5 5 in the direction of the arrows indicated on said circuit, as will be clearly seen from said Fig. 1.

When the train has attained a speed of about eighteen miles per hour, a make-and-break switch F in the main circuit, which has previously made contact at $f$ and $f'$ with the self-excited circuits 6 6 and 7 7, connected with the dynamo-fields to complete the main circuit by breaking such contact at $f$ and $f'$, when a shunt-magnet G, connected with said switch, becomes energized and attracts its armature-bar $g$, and thereby cuts in the main dynamo in circuit with either one of the batteries H or H', according to the position of the regulating-arm of the apparatus $m$. Said circuits 6 6 and 7 7, directly connected at $f$ and $f'$, can be directly traced from Fig. 1, said circuit 6 6 being connected with the spring-contact $d$ and the circuit 7 7 with the spring-contact $d'$, thereby completing the circuits, the current passing through said circuits in the direction of the arrows, as indicated in said Fig. 1. The main dynamo A is wound with a few turns 8 in circuit with 6 6 and a few turns 9 in circuit with 7 7 for self-excitation, such windings being in two separate portions, as shown, one for one direction of armature rotation and the other for the opposite direction of armature rotation. Of course it will be understood that this method of winding becomes a necessity, since it is evident that as a self-exciting machine one winding answers only for the purpose of one direction of armature rotation, and the apparatus being intended for use in train-lighting systems, in which the armature rotation is subject to reversal, a second winding becomes an absolute necessity; otherwise the magnetism in the fields of the dynamo would be cut down to nothing. Therefore, in order to overcome this difficulty it is necessary to use two windings, one for each direction of armature rotation. When the speed of the train thus increases, said self-excited circuits, having previously started the dynamotor, as has been stated, are now broken, which leaves the main dynamo in the main circuit with independently-excited fields. The current now being generated from the main dynamo passes through the pole-changer B to form a complete system, which is as follows: It having been previously shown and described how the weak current from the dead fields of the main dynamo A, when the latter is started, induced in the dynamo-armature by the residual magnetism in the iron fields, acts upon the magnets $b$ and $b'$ of the pole-changer B to cause contact to be made with either pair of mercury-cups or other like contacts, the result will be that a complete circuit through the main-line circuits is caused and the movement of the pole-changer not only reverses the polarity of the external circuit, but also connects one or the other of the self-excited circuits of the dynamo with the contacts $d$ or $d'$ according to the direction of the armature rotation. It will now be seen that when the self-excited fields of the main dynamo have had their circuits closed by the action of the pole-changer, and the armature is still rotating, the main dynamo A must build up its fields as a self-excited machine, and in doing so it will operate the dynamotor E E', which is fed from the main circuit and receives its current directly from the main dynamo A and is arranged in said main circuit in such a manner that it is not affected by the closing of the switch F. Said dynamotor at the same time generates current and delivers it to the fields of the main dynamo to excite the same. As soon as the switch F in the main circuit closes and thereby establishes a complete circuit between the main dynamo A and one of the storage-batteries, it, at the same time and with the same movement, breaks the self-excited circuits of the dynamo, leaving the latter now operating with independent dynamo excitation. The current generated passes into the main circuit from the brushes of the dynamo A in the usual manner, flowing from the positive pole down to the pole-changer B, down through a small wire coil $k$ through one of the fingers $c'$ of the arm C of the pole-changer to the mercury-cup $c^2$, contact having been established at this cup, following the circuit-wire 10 in the direction of the arrows to an ordinary switch L, through wire 11 to the shunt-magnet G in the shunt-circuit, (see Fig. 1,) the armature $g$ thereof closing the circuit at $g'$, thence by wire 12 to the switch or controller $m$, the hand-piece of which is making contact at $m'$ and through wires 13 and 14 to the battery H, charging the same; thence from said battery H through wire 15 to contact $m^2$ of the switch $m$, wire 16 to switch L. The current next passes through the wire 17 to the dynamotor in the opposite direction of the current passing through the dynamotor in the circuit previously mentioned, tending to demagnetize the fields of said machine and weakening the current generated by the dynamotor in proportion to the increase of the armature speed of the main dynamo A in the manner described in connection with my previous patent hereinabove mentioned. The current coming from the wire 17, after leaving the dynamotor, follows the wire 18 to wire 19 and thence passes through the second mercury-cup $c^2$ into the contact-finger $c'$ to the small wire coil $k'$ and back to the negative pole at the opposite brush of the dynamo, thereby completing the main circuit, when the car, and hence the armature of the dynamo, is going in one direction. Thus it will be seen that the dynamotor is capable of equalizing the electromotive force of the main dynamo and maintains the output therefrom constant in the manner described in my previous patent, No. 525,993.

The construction and arrangement of the swith or controller $m$ and the batteries H and H' are similar to that described in my former patent, No. 525,992, of September 11, 1894, and therefore need not be further described here. Suffice it to say that while the battery H is being charged the battery H' feeds the lights in the circuit containing the lamps N. The current from the battery H' passes through the wire 20 to arm $m^3$ of the switch $m$, then through wire 21 through a suitable rheostat O and the wire 21 to switch L', then through wire 22 to the lamp-circuit in the car, back through the wire 23 to the switch L' and wire 24 to arm $m^4$ of the switch $m$ and the wire 25 to the battery, whereby a complete lamp-circuit is established, as will be clearly evident.

If it is desired to store the electricity in the battery H' and bring the battery H in the lamp-circuit to feed the lamps N, the hand-piece of the switch $m$ is turned so that the arms $m'$, $m^2$, $m^3$, and $m^4$ will respectively make contact with the posts $x'$, $x^2$, $x^3$, and $x^4$, thereby causing the current coming from the wire 12 into arm $m'$ to pass along the wire 26 to wire 20 into the battery H' and out along the wire 25 and short wire 27 to the post $x^2$, arm $m^3$, and wire 16 to switch L, and by wire 17, &c., back to the dynamo to establish the complete circuit for storing the electricity in the battery H'. The current from the battery H, which is now in the light-circuit, passes along wire 14 to post $x^3$ and arm $m^3$ to wire 21, rheostat O, switch L', and wire 22 to the circuit containing the lamps N, then back through wire 23, switch L', wire 24, to arm $m^4$, and by the post $x^4$ and wire 28 to wire 15, and finally to the battery H, whereby a complete lamp-circuit is established. Now, when the car is moving in the opposite direction, the arm C of the pole-changer B is tilted in the opposite direction, in the manner and for the reasons hereinabove fully explained, bringing the fingers $c'$ on the opposite end of the said arm down into the two mercury-cups $c^3$, and the current now passes from the dynamo-brush through the coil $k'$ to the one cup $c^3$ and the wire 29 into the wire 10, through the switch L, following up the different circuits, passing through the switch $m$, the batteries, the dynamotor, to regulate the output of the main dynamo and maintain the same constant, and finally coming in by the wires 18 and 19 to wire 30, which is connected with the second mercury-cup $c^3$, passing through the finger $c'$ to the coil $k$ and thence to the opposite brush of the main dynamo to complete the circuit.

A voltmeter P may be arranged in the circuit wires 14 and 15, and a voltmeter P' may be placed in the circuit-wires 20 and 25.

By my present invention I have succeeded in producing an operative and complete system of wiring from the main dynamo through the car, comprising therein mechanism for controlling and maintaining the equalization of the electromotive force from the main dynamo on the car-wheel axle, by increasing or decreasing the intensity of its magnetic fields, to make up for the increase or decrease of the speed of the armature, and an arrangement of a working or main circuit containing lamps or other translating devices in which I have arranged independently-operating storage-batteries.

Of course it will be evident that certain changes may be made in the minor arrangements and combinations of the circuits and electrical devices, and I therefore do not limit my invention to the exact arrangements of the several parts as herein shown. It will be understood that my invention is applicable not only to a car-wheel axle, but it is of great utility where the main dynamo is driven from other sources of variable speed or where the armature is subjected to reversal.

Having thus described my invention, what I claim is—

1. The combination with a working and a lamp circuit, containing lamps or other translating devices, of a main dynamo operated under varying speeds and subject to armature reversal, a pole changer and a dynamotor adapted to equalize the voltage of the dynamo in the main circuit, said main dynamo being self-exciting at a slow speed, to energize said pole changer and the dynamotor, and said main dynamo, at a fast speed, having its fields excited and regulated independently by the dynamotor, substantially as and for the purposes set forth.

2. The combination with a working and a lamp circuit, containing lamps or other translating devices, of a pair of storage batteries, a main dynamo operated under varying speeds and subject to armature reversal, a switch for connecting either one of said batteries directly in circuit with the main dynamo and the other of said batteries in circuit with the lamp circuit, a pole changer, and a dynamotor adapted to equalize the voltage of the dynamo in the main circuit, said dynamo being self-exciting at a slow speed, and, at a fast speed, having its fields excited and regulated independently by the dynamotor, substantially as and for the purposes set forth.

3. The combination with a working and a lamp circuit, containing lamps or other translating devices, of a main dynamo operated under varying speeds and subject to armature reversal, a pole changer in circuit with said main dynamo, said dynamo being wound for self-excitation, and a dynamotor, in circuit with said dynamo, said dynamotor being also wound for self-excitation in two separate circuits, an automatic switch F in said self-excited circuits, and said dynamotor being adapted to equalize the voltage of the dynamo in the main circuit, and the fields of the dynamo being excited independently by the dynamotor, substantially as and for the purposes set forth.

4. The combination with a working and a lamp circuit, containing lamps or other translating devices, of a pair of storage batteries, a main dynamo operated under varying speeds and subject to armature reversal, a switch connecting either one of said batteries directly in circuit with the main dynamo and the other of said batteries in circuit with the lamp circuit, a pole changer in circuit with said main dynamo, said dynamo being wound for self-excitation, a dynamotor in circuit with said dynamo, said dynamotor being also wound for self-excitation in two separate circuits, an automatic switch F in said self-excited circuits, and said dynamotor being adapted to equalize the voltage of the main dynamo in the main circuit, and the fields of said dynamo being independently excited by the dynamotor, substantially as and for the purposes set forth.

5. The combination with a working and a lamp circuit, containing lamps or other translating devices, of a main dynamo operated under varying speeds and subject to armature reversal, a pole changer in said main circuit, having magnets adapted to be energized by the feeble current induced by the residual magnetism in the dead fields of the dynamo, to complete the main circuit, and a dynamotor adapted to excite and equalize the voltage of the dynamo in the main circuit, said dynamotor being connected up in the main circuit, and also connected with the main dynamo by a self-excited circuit, whereby the main dynamo, at a slow speed, excites the said dynamotor, but at a fast speed, the dynamotor being adapted to excite the fields of the main dynamo, substantially as and for the purposes set forth.

6. The combination with a working and a lamp circuit, containing lamps or other translating devices, of a pair of storage batteries, a main dynamo operated under varying speeds and subject to armature reversal, a switch connecting either one of said batteries directly in circuit with the main dynamo, and the other of said batteries in circuit with the lamp circuit, a pole changer in said main circuit, having magnets adapted to be energized by the feeble current induced by the residual magnetism in the dead fields of the main dynamo, to complete the main circuit, and a dynamotor adapted to excite and equalize the voltage of the dynamo in the main circuit, said dynamotor being connected up in the main circuit and also connected with the main dynamo by a self-excited circuit, whereby the main dynamo, at a slow speed, excites the said dynamotor, but at a fast speed, the dynamotor being adapted to excite the fields of the main dynamo, substantially as and for the purposes set forth.

In testimony that I claim the invention set forth above I have hereunto set my hand this 18th day of February, 1895.

MORRIS MOSKOWITZ.

Witnesses:
FREDK. C. FRAENTZEL,
WM. H. CAMFIELD, Jr.